June 12, 1923.
F. L. ROWNTREE
ROLLER BEARING CASTER
Filed July 14, 1921
1,458,778
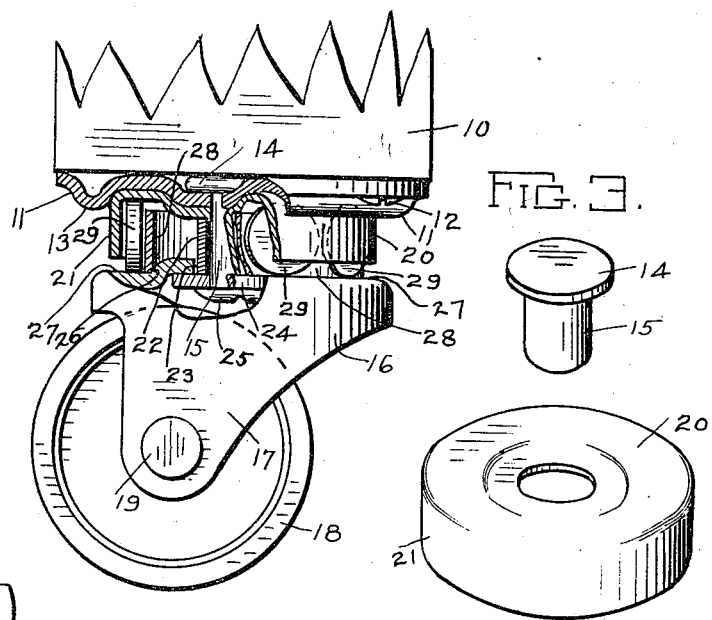

Patented June 12, 1923.

1,458,778

UNITED STATES PATENT OFFICE.

FRANK L. ROWNTREE, OF MERIDEN, CONNECTICUT, ASSIGNOR TO FOSTER, MERRIAM & COMPANY, OF MERIDEN, CONNECTICUT, A CORPORATION OF CONNECTICUT.

ROLLER-BEARING CASTER.

Application filed July 14, 1921. Serial No. 484,573.

*To all whom it may concern:*

Be it known that I, FRANK L. ROWNTREE, a citizen of the United States, residing at Meriden, county of New Haven, State of Connecticut, have invented an Improvement in Roller-Bearing Casters, of which the following is a specification.

This invention relates to roller bearing casters and has for an object to provide improved means for retaining the rollers in the raceway, which means will be a simple element formed separate from the other elements of the caster and which will effectively retain the rollers in proper operative position to prevent binding and insure reliable operation.

With this and other objects in view I have devised the improved caster illustrated in the accompanying drawings in which:

Fig. 1 is an elevation of a plate type of caster, portions thereof being broken away to more clearly disclose the construction;

Fig. 2, a similar view of a stem type of caster;

Fig. 3, an exploded view showing the various elements in perspective;

Fig. 4, a perspective view of an angled type of plate; and

Fig. 5, is a perspective view of plate employed in the type shown in Fig. 1.

On the lower end of the leg 10 of a piece of furniture is mounted plate 11, this plate being secured to the leg by means of suitable screws 12. The plate is formed with an annular rib 13 and a central recess on the top thereof in which is seated the head 14 of an axle or spindle 15, this axle or spindle forming a swivel for the horn 16 provided with spaced ears 17 in which is mounted the wheel 18 by means of a rivet 19. The rivet 19 forms an axle for the wheel 18 and is offset to one side of the axis of axle 15 as is usual in such constructions.

Embracing the axle 15, and formed to fit the lower surface of the plate 11 within the rib 13, is an inverted cup member 20 having downwardly extending side walls 21. Embracing the axle 15 is a sleeve or bushing 22 extending within the opening 23 in the upper wall of the horn 16 to form a bearing for this horn on the axle. It will be noted from an inspection of Fig. 1 that the upper wall of the horn has a recess on its under side in which the washer 24 rests, it being retained therein by the head 25 on the lower end of the axle 15. The formation of the recess for the washer 24 raises the metal above the upper surface of the horn forming a shoulder 26 adjacent to the raceway 27 on the upper surface of the horn. This shoulder provides convenient means for loosely retaining a tubular ring 28 in inwardly spaced relation to walls 21 of the cup member, this ring and the walls forming opposed guides for the rollers 29 mounted to run in the raceways. This ring is loose or floating and so is free to turn when pressure is applied on side of rollers, so that under these conditions instead of binding the ring turns with the rollers making a very freely operating caster. The ring 28 is formed from a piece of tubing and may be slit at one side at 30. It will be apparent that the caster is very simple in construction. In forming the roller mounting only two operations are necessary, one for the inverted cup and another for the ring, and, therefore, the cost of manufacture of the caster is greatly reduced.

The construction of the caster in Fig. 2 is the same as that shown in Fig. 1 except that a stem 31 formed with the axle 15 takes the place of plate 11 for securing the caster to an article to be supported thereby.

Fig. 4 represents in perspective a modified form of the plate to take the place of the plate 11. This plate has upwardly extending wings 32 provided with openings 33 for the passage of screws to fasten same to the article.

Having thus set forth the nature of my invention, what I claim is:

1. A caster comprising an inverted cup having a roller raceway, rollers mounted in said raceway, a ring loosely mounted inwardly of the side walls of the cup and forming therewith opposed guides for the rollers, an axle within the cup, and a wheel carrying horn mounted to turn on the axle and having a raceway for the rollers, said ring being adapted to yield laterally independently of both the horn and cup under lateral pressure from the rollers.

2. A caster comprising a supporting element, an axle carried thereby, an inverted cup mounted on said axle and forming a roller raceway, a horn mounted to turn on said axle, a wheel mounted in said horn, rollers mounted to roll on the horn and cup, and a loosely mounted split ring between the horn and cup, spaced from the side walls of the cup and cooperating therewith to form opposed guides to retain the rollers in position.

3. A caster comprising a supporting element, an axle carried thereby, an inverted cup carried by the axle and having an annular raceway, rollers mounted in said raceway, a ring loosely mounted inwardly of the side walls of the cup and forming therewith opposed guides for the rollers, and a wheel carrying horn mounted to turn on the axle and having a raceway for said rollers, said ring being adapted to yield laterally independently of both the horn and cup under lateral pressure from the rollers.

In testimony whereof I affix my signature.

FRANK L. ROWNTREE.